Sheet 1–4 Sheets.

Evrard & Boyer,
Making Hinges,

Nº 55,794. Patented June 19, 1866.

Witnesses:
Inventors:

Sheet 2—4 Sheets.

Evrard & Boyer,
Making Hinges,

N° 55,794. Patented June 19, 1866.

Witnesses:

Inventors:

Evrard & Boyer,
Making Hinges,
N° 55,794. Patented June 19, 1866.
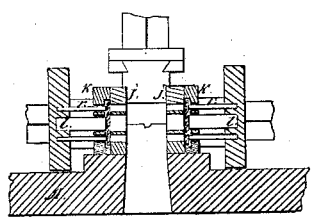
Fig. 4.
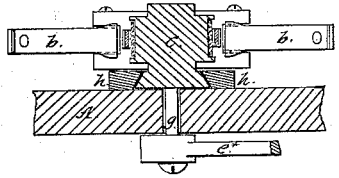
Fig. 5.
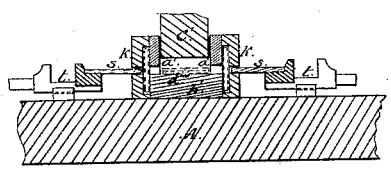
Fig. 6.
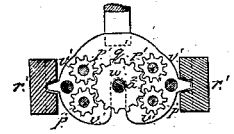
Fig. 7.
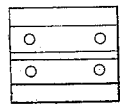
Fig. 9.
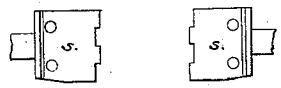
Fig. 8.
Fig. 18.
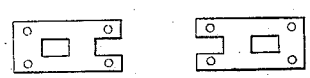
Fig. 12.
Fig. 13.
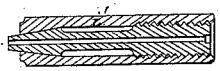
Fig. 10.
Fig. 11.
Fig. 14.
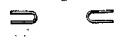
Fig. 15.
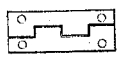
Fig. 16.
Fig. 17.
Witnesses;
Inventors;

UNITED STATES PATENT OFFICE.

JEAN BAPTISTE EVRARD AND JEAN PIERRE BOYER, OF PARIS, FRANCE.

IMPROVEMENT IN MACHINES FOR MAKING HINGES.

Specification forming part of Letters Patent No. 55,794, dated June 19, 1866.

*To all whom it may concern:*

Be it known that we, JEAN BAPTISTE EVRARD and JEAN PIERRE BOYER, both of Paris, in the Empire of France, have invented certain new and useful Improvements in Machinery for the Manufacture of Hinges; and we do hereby declare that the following is a full, clear, and exact description thereof, which will enable others skilled in the art to make and use the same, reference being had to the accompanying drawings, forming part of this specification, in which—

Figure 1:
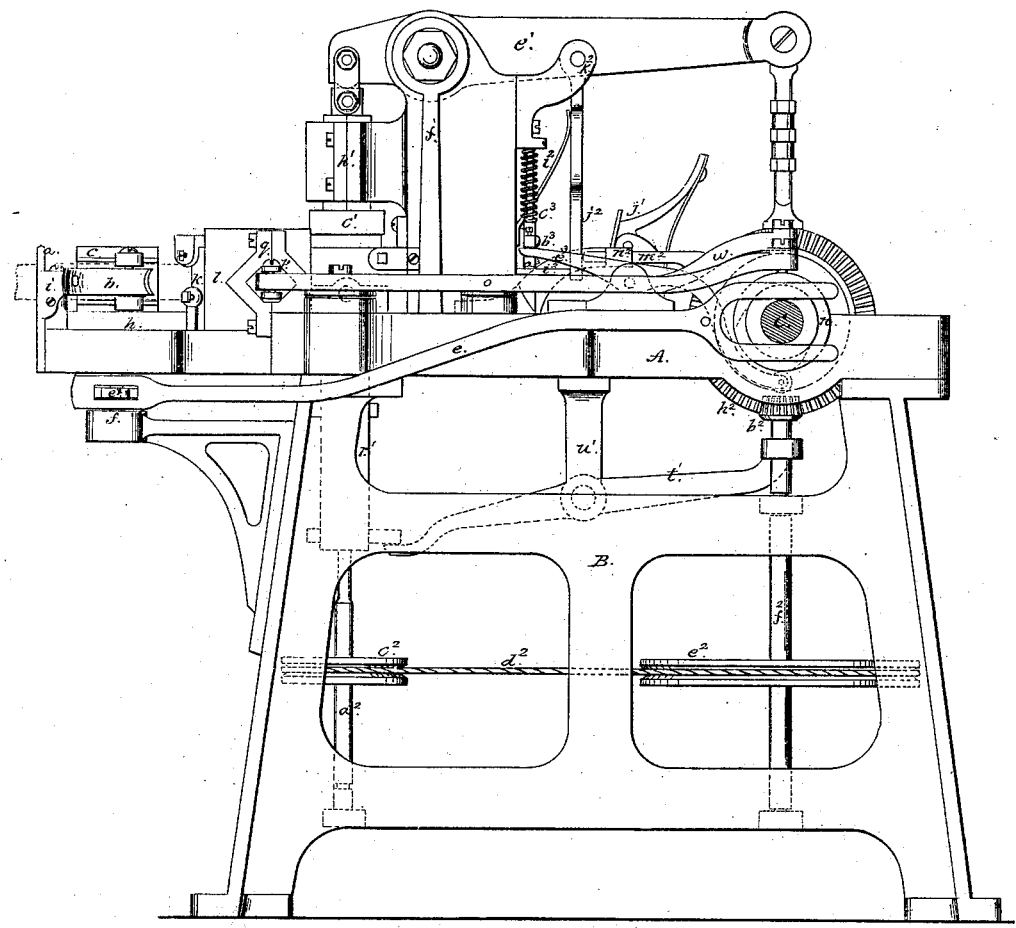
Figure 2:
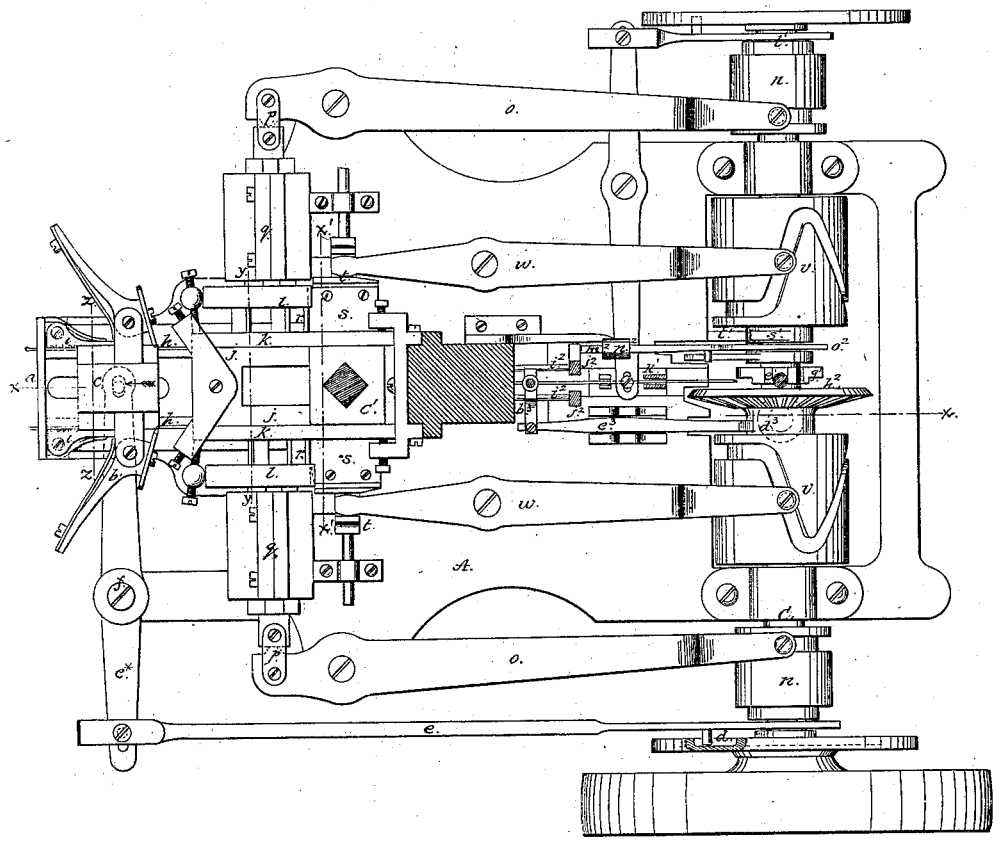
Figure 3:
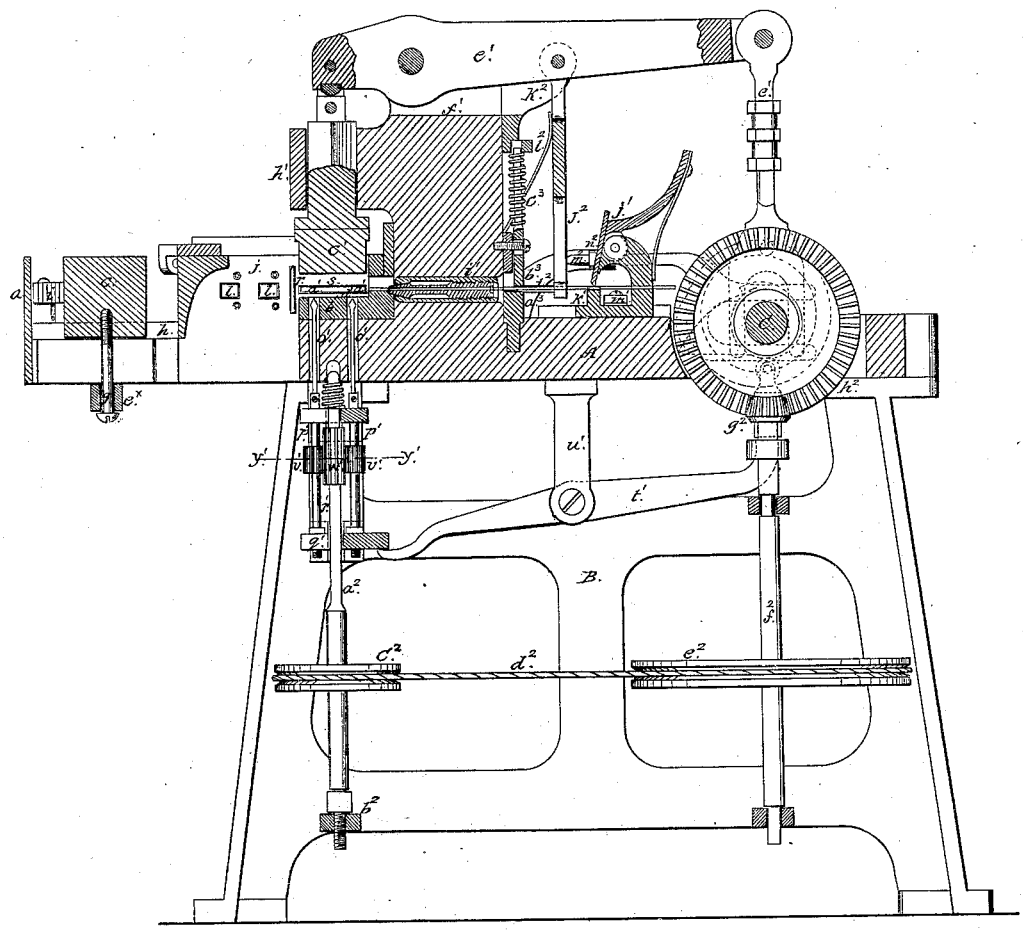

Figure 1 represents a side elevation of our invention. Fig. 2 is a plan or top view of the same, partly in section. Fig. 3 is a longitudinal vertical section of the same, the line $x\ x$, Fig. 2, indicating the plane of section. Fig. 4 is a transverse vertical section of the punching mechanism detached, the plane of section being indicated by the line $y\ y$, Fig. 2. Fig. 5 is a similar section of the feed mechanism, taken in the plane indicated by the line $z\ z$, Fig. 2. Fig. 6 is a similar section of the mechanism for loading the two parts of the hinges and for uniting them together, the line $x'\ x'$, Fig. 2, indicating the plane of section. Fig. 7 is a horizontal section of the mechanism used for countersinking the holes in the hinges, the plane of section being indicated by the line $y'\ y'$, Fig. 3. Fig. 8 is a detached plan of the tool used for the purpose of pushing the two halves of the hinges together. Fig. 9 is a detached plan of the guide-plate used in countersinking the hinges. Fig. 10 is a longitudinal central section of the guide for the wire. Fig. 11 is an end view of the same. Figs. 12 to 18 are views of the hinges in different stages of completion.

Similar letters of reference indicate like parts.

This invention relates to a machine for manufacturing that class of hinges known as "butt" hinges, and made of two halves, each half being made of a piece of sheet metal cut out and doubled up so as to form loops, through which the wire can be passed that serves to unite the two halves of the hinge.

The machine which forms the subject matter of this present invention performs all these operations automatically, the two strips of metal required for the two halves of the hinges being fed automatically to the punches, to the cutters, and to the devices for doubling up the pieces forming the loops, pushing the two halves together, inserting the wire, and cutting off the same, and furthermore, a carriage is applied, which forms the bearings for a series of countersinks placed in such a position that by their action all the holes in each hinge are countersunk simultaneously, and the hinges on being delivered from the machine are complete and ready for immediate use.

A represents a frame or table, made of cast-iron or any other suitable material, and supported by legs B, of any desirable form or construction, and at a suitable height above the ground. This table forms the bearings for the driving-shaft C of the machine, to which a revolving motion is imparted by a belt-wheel or any other suitable mechanism. On this shaft are mounted the several cams and cog-wheels which serve to impart the requisite motions to the various devices which constitute our machine.

The plates or strips of sheet metal from which the hinges are made are fed to the punches, cutters, &c., through suitable slots in the front plate, $a$, of the machine, the feed motion being produced by two spring-dogs, $b$, which are hinged to a carriage or sliding head, $c$, so that their points bear on the plates in an oblique direction, as shown in Fig. 2 of the drawings. If the head $c$ is moved in the direction of the arrow marked on it in said figure the points of the dogs slide over the plates without producing any effect thereon, but if the head is moved in a direction opposite to said arrow the points of the dogs bite into the plates and feed them forward to the cutters and punches.

The requisite motion is imparted to the head $c$ by the action of a cam-slot, $d$, on a slotted rod, $e$, one end of which is provided with a suitable pin catching into said cam-slot, whereas its opposite end is pivoted to one end of a lever, $e^*$, that has its fulcrum on a pivot, $f$, secured in a bracket attached to one of the legs of the table A, and the other end of which connects by a screw or stud, $g$, with the head. This stud moves in a slotted arm projecting from the table A, and dovetailed strips $h$, secured to the upper surface of said arm, form the guides for the head, as seen particularly in Fig. 5. The sides of the head $c$ are provided with flat grooves, just wide enough to receive the plates and to form guides of the same, and serrated spring-pawls $i$ are applied in such a manner that they prevent the plates from moving back with the dogs $b$ and head $c$. These pawls also serve to facilitate the introduction of a second strip if the strip first fed in is used up. The motion of the head $c$ is regulated to correspond to the length of the hinges to be made, and by making in the lever $e^*$ different holes the throw of said head can be readily changed for hinges of different length.

By the action of the dogs $b$ the plates are carried in between the dies $j$ and guide-plates $k$, (see Fig. 4,) where they are exposed to the action of the punches $l$. Each of these punches is arranged so that it makes four round and two oblong holes in each plate, as shown in Fig. 12, and said punches are secured in heads to which a reciprocating motion is imparted by the action of cams $n$ and oscillating levers $o$, which connect with the shanks of said heads by links $p$, as shown in Fig. 2, the shanks being guided in suitable boxes, $q$, secured to the table A. The heads of the punches also carry the cutters $r$, which serve to cut off from the plates the lengths necessary for each hinge; but it is obvious that these cutters cannot act until the first two blanks for a hinge have been punched and fed in beyond said cutters to a distance equal to the length of the hinges to be produced. The pieces cut off by the cutters are exposed to the action of the bending-tools $s$, a section of which is shown in Fig. 6 and a plan in Fig. 8. These tools are secured to carriages $t$, which move in suitable guides secured to the surface of the table A, and to which motion is imparted by cams $v$ and levers $w$, the cams $v$ being mounted on the driving-shaft C, as shown in Fig. 2. The tools $s$ are guided in suitable slots in the guide-plates $k$, and they force the blanks through slots $a'$ close over the anvil $b'$, as shown in Fig. 6, and in being forced through these slots in opposite directions the blanks are bent and pushed together, as shown in Figs. 16 and 17.

After the blanks have been bent and pushed together the wire which unites the two halves of the hinge is inserted and the hammer $c'$ is brought down so as to depress the loop of the hinge into a cavity, $d'$, in the anvil, and after the wire has been cut the holes in the hinge are countersunk, and then said hinge is discharged from the machine by suitable mechanism, which will be presently more fully described.

The hammer $c'$ is suspended from a lever, $e'$, which has its fulcrum in a standard, $f'$, rising from the table A, and to which an oscillating motion is imparted by a cam, $g'$, on the driving-shaft C, and the shank of the hammer is guided in a suitable box, $h'$, secured to the front end of the standard $f'$, as shown in Figs. 1 and 3 of the drawings.

The wire which unites the two halves of the hinges is passed through a guide-tube, $i$, (see Figs. 10 and 11,) which passes through the lower part of the standard $f'$, and which is made in two parts, the inner part being made movable, so that it can be taken out and replaced by another with a smaller or larger opening, according to the size of hinges to be manufactured.

The requisite feed of the wire is effected by a spring-dog, $j'$, which operates in a similar manner to the feeding-dogs of the plates, as previously described. It is secured to a carriage, $k'$, which moves in suitable guideways on the table A, a reciprocating motion being imparted to it by the action of a cam, $l'$, on the driving-shaft, and of a lever, $m'$, which has its fulcrum on a pivot secured in the table A, as seen in Fig. 2 of the drawings. The point of the spring-dog $j'$ (see Fig. 3) is so adjusted that it slides over the surface of the wire if the carriage moves back; but if the carriage is drawn forward the point of the dog clamps the wire tight and compels the same to move through the two halves of the hinge which have been bent by the tools $s$, as previously described, and in order to prevent the wire from moving back spontaneously it passes through a spring-clamp, $a^3 b^3$, the lower jaw of which is stationary, while its upper jaw is movable and depressed by a spring, $c^3$. When the wire is to be fed the jaw $b^3$ is raised by the action of a cam, $d^3$, and lever $e^3$. After the wire has thus been entered in the hinge it is cut off by the action of the hammer $c'$ against a shoulder, $n'$, (see Fig. 3,) said hammer being caused to act on the wire while it descends for the purpose of bringing the loop of the hinge to the desired form. The shoulder $n'$ is formed in a plate of steel, which is fitted to the upper surface of the table, as shown in Fig. 3, and which forms the guides for the countersinks $o'$, used for the purpose of countersinking the holes in the hinges. These countersinks are secured in vertical spindles $p'$, which have their bearings in a carriage, $q'$, which is situated below the table A, and to which a rising-and-falling motion is imparted in suitable guides, $p'$, by the action of a cam, $s'$, on a lever, $t'$, which has its fulcrum in a hanger, $u'$, suspended from the under side of the table. The cam $s'$ is mounted on the driving-shaft C, and can be seen in Fig. 2 of the drawings, whereas the lever $t'$ and the carriage $q'$, with its appendages, can be seen best in Fig. 3, and the spindles in Fig. 7.

On each of the spindles $p'$ is mounted a pinion, $v'$, gearing into a cog-wheel, $w'$, that is mounted on an arbor, $a^2$. This arbor is stepped in a suitable cross-bar, $b^2$, secured between the legs supporting the table A, and its upper end has its bearing in a socket in the under surface of the table. It passes through the carriage $q'$ in such a position that it is equidistant from the several spindles $p'$, and the cog-wheel $w'$ is of such a thickness or height that the pinions $v'$ do not pass beyond it as the same move up and down with the carriage $q'$. On the arbor $a^2$ is mounted a band wheel or pulley, $c^2$, and a rapid rotary motion is imparted to it by a belt, $d^2$, extending around said pulley $c^2$ and around another large pulley, $e^2$, mounted on a vertical shaft, $f^2$, which has its bearings in two cross-bars secured between the legs supporting the table A, and on the upper end of which is mounted a bevel-pinion, $g^2$. This pinion gears into a bevel-wheel, $h^2$, mounted on the driving-shaft C, and by the action of these bevel-wheels and pulleys, in combination with the belt $d^2$, a continuous and very rapid revolving motion is imparted to the countersinks, causing them to produce the desired effect as soon as the carriage $q'$ is raised to bring their points in contact with the metal round the holes in the hinges.

After the holes are countersunk the pusher $i^2$ comes into action. This pusher consists of one or two rods, which are secured in a forked hanger, $j^2$, suspended from a bracket, $k$, that is secured to the standard $f'$. A spring, $l^2$, forces the hanger and the pusher-rods back toward the driving-shaft and against the end of a rod, $m^2$, which moves in a suitable guide, $n^2$, rising from the table A, and to which a longitudinal motion is imparted by a cam, $o^2$, that is mounted on the driving-shaft C, as seen in Fig. 3. The pusher-rods extend through suitable holes in the standard $f'$, on either side of the guide-tube $i'$, through which the wire is fed that unites the two halves of the hinge, and in order to bring said pusher-rods to bear on the proper points, and also to obtain guides for said rods, semicircular grooves $p^2$ are made in said tube, as seen in Fig. 11. On being pushed off from the anvil $b'$ the ready-made hinges drop down through a slot in the table, and they are collected in a suitable box or receptacle placed under said table, the motion of the several parts of the machine being so timed that for each revolution of the driving-shaft one hinge, such as shown in Fig. 18, is completed.

We claim as new and desire to secure by Letters Patent—

1. The arrangement of the spring-dogs $b$, reciprocating carriage $c$, in combination with the slotted rod $e$, with its cam-slot $d$, the lever $e^*$, dovetailed strips $h$, operating in the manner and for the purpose herein specified.

2. The punches $l$ and knives $r$, in combination with the cams $n$, levers $o$, and with the guide-grooves through which the blanks are fed, constructed and arranged substantially as and for the purpose set forth.

3. The bending-tools $s$ and grooves $a'$, in combination with cams $v$ and levers $w$, constructed, arranged, and operating substantially as and for the purpose described.

4. The arrangement of the dog $j'$, cam $l'$, lever $m'$, constructed and operating in the manner and for the purpose specified.

5. The spring-clamp $a^3$ $b^3$, in combination with the cam $d^3$ and lever $e^3$, substantially as and for the purpose set forth.

6. The adjustable guide-tube $i$, arranged in combination with the mechanism for feeding in and bending the plates and feeding the wire, substantially as and for the purposes specified.

7. The countersinks $o'$ $o'$, applied in combination with the mechanism for feeding in, bending, and cutting off the plates, substantially as and for the purpose set forth.

EVRARD.
BOYER.

Witnesses:
E. HENRI GOULD,
DEMAS.